(12) United States Patent
Maggu et al.

(10) Patent No.: US 11,050,551 B2
(45) Date of Patent: Jun. 29, 2021

(54) SECURE VERIFICATION OF CONDITIONS OF A CONTRACT USING A SET OF VERIFICATION TOOLS

(71) Applicant: Accenture Global Solutions Limited, Dublin (IE)

(72) Inventors: Isha Maggu, London (GB); Ian Lobo, Brights Grove (CA); Ian Gray, Braunton (GB); Moustafa Bounasser, Newcastle upon Tyne (GB)

(73) Assignee: Accenture Global Solutions Limited, Dublin (IE)

( * ) Notice: Subject to any disclaimer, the term of this patent is extended or adjusted under 35 U.S.C. 154(b) by 84 days.

(21) Appl. No.: 16/597,099

(22) Filed: Oct. 9, 2019

(65) Prior Publication Data
US 2020/0044825 A1 Feb. 6, 2020

Related U.S. Application Data

(63) Continuation of application No. 15/726,118, filed on Oct. 5, 2017, now Pat. No. 10,491,375.

(51) Int. Cl.
*H04L 29/06* (2006.01)
*H04L 9/06* (2006.01)
(Continued)

(52) U.S. Cl.
CPC ......... *H04L 9/0637* (2013.01); *G06Q 10/103* (2013.01); *G06Q 20/06* (2013.01);
(Continued)

(58) Field of Classification Search
CPC . H04L 9/0637; H04L 2209/20; G06Q 10/103; G06Q 20/06; G06Q 20/223;
(Continued)

(56) References Cited

U.S. PATENT DOCUMENTS

2002/0010686 A1\* 1/2002 Whitesage ......... G06Q 30/0202
705/80
2007/0067068 A1\* 3/2007 Havlena ............... G05B 13/048
700/291

(Continued)

OTHER PUBLICATIONS

Buterin V., et al., "Ethereum White Paper: A Next-Generation Smart Contract and Decentralized Application Platform," Facts & Figures 2009, Recurring Feature; 2010 SRI C8052-13.410.1, Jan. 2010, 36 pages. [retrieved on Mar. 1, 2019] Retrieved from the Internet: [URL:https://cryptorating.eu/whitepapers/Ethereum/Ethereum_white_paper.pdf].

(Continued)

*Primary Examiner* — Sher A Khan
(74) *Attorney, Agent, or Firm* — Harrity & Harrity, LLP (57) ABSTRACT

A device may receive a request for a contract associated with a project. The request may include a blockchain identifier for an organization associated with the project and a set of project requirements for the project. The device may generate the contract using information included in the request. The contract may include one or more conditions that are associated with the set of project requirements. The device may create one or more blocks in a blockchain using the one or more conditions of the contract and the blockchain identifier. The device may receive multimedia data associated with completion of a phase of the project. The device may verify whether the phase of the project is complete using metadata associated with the multimedia data. The (Continued)

device may perform one or more actions based on verifying whether the phase of the project is complete.

20 Claims, 7 Drawing Sheets

(51) Int. Cl.
   *G06Q 20/40* (2012.01)
   *G06Q 40/02* (2012.01)
   *G06Q 10/10* (2012.01)
   *G06Q 20/38* (2012.01)
   *G06Q 20/06* (2012.01)
   *G06Q 50/18* (2012.01)
   *G06Q 20/22* (2012.01)
   *G06Q 20/36* (2012.01)
   *H04W 12/06* (2021.01)

(52) U.S. Cl.
   CPC ....... *G06Q 20/223* (2013.01); *G06Q 20/3678* (2013.01); *G06Q 20/389* (2013.01); *G06Q 20/4016* (2013.01); *G06Q 40/02* (2013.01); *G06Q 50/18* (2013.01); *G06Q 2220/00* (2013.01); *H04L 2209/20* (2013.01); *H04W 12/06* (2013.01)

(58) Field of Classification Search
   CPC ............. G06Q 20/3678; G06Q 20/389; G06Q 20/4016; G06Q 40/02; G06Q 50/18; G06Q 2220/00; H04W 12/06
   See application file for complete search history.

(56) References Cited

U.S. PATENT DOCUMENTS

| | | |
|---|---|---|
| 2007/0299828 A1 | 12/2007 | Lewis et al. |
| 2011/0305394 A1 | 12/2011 | Singer et al. |
| 2012/0136807 A1* | 5/2012 | Bendel .................. G06Q 40/06 705/36 R |
| 2015/0193709 A1* | 7/2015 | Ramesh Babu ... G06Q 10/0637 705/7.28 |
| 2015/0363778 A1 | 12/2015 | Ronca et al. |
| 2017/0046698 A1 | 2/2017 | Haldenby et al. |
| 2017/0230189 A1* | 8/2017 | Toll ....................... H04L 9/3247 |
| 2017/0232300 A1 | 8/2017 | Tran et al. |
| 2017/0286880 A1* | 10/2017 | Wiig .................... G06Q 10/067 |
| 2018/0068271 A1* | 3/2018 | Abebe ................. G06Q 10/103 |
| 2018/0123882 A1* | 5/2018 | Anderson ........... H04L 41/0813 |
| 2018/0158162 A1* | 6/2018 | Ramasamy ........ G06Q 20/3827 |
| 2018/0260212 A1* | 9/2018 | Wisnovsky ............... G06F 8/71 |
| 2018/0260888 A1* | 9/2018 | Paolini-Subramanya ................... G06Q 20/4016 |
| 2019/0044727 A1 | 2/2019 | Scott et al. |
| 2019/0109702 A1 | 4/2019 | Maggu et al. |

OTHER PUBLICATIONS

Christidis K., et al., "Blockchains and Smart Contracts for the Internet of Things," IEEE Access, 2016, vol. 4, pp. 2292-2303.
Extended European Search Report for Application No. EP18198770.2, dated Mar. 26, 2019, 8 pages.

* cited by examiner

SECURE VERIFICATION OF CONDITIONS OF A CONTRACT USING A SET OF VERIFICATION TOOLS

RELATED APPLICATION

This application is a continuation of U.S. patent application Ser. No. 15/726,118, filed Oct. 5, 2017, which is incorporated herein by reference.

BACKGROUND

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but may securely exchange information. Further, the distributed ledger may correspond to a record of consensus with a cryptographic audit trail that is maintained and validated by a set of independent computers.

SUMMARY

According to some possible implementations, a device may receive a request for a contract associated with a project. The request may include a blockchain identifier for an organization associated with the project and a set of project requirements for the project. The contract may include one or more conditions that are associated with the set of project requirements. The device may create one or more blocks in a blockchain using the one or more conditions of the contract and the blockchain identifier. The device may receive multimedia data associated with completion of a phase of the project. The device may analyze the multimedia data to generate metadata associated with the multimedia data. The device may verify whether the phase of the project is complete by comparing the metadata associated with the multimedia data and the one or more blocks in the blockchain associated with the one or more conditions of the contract. The device perform one or more actions based on verifying whether the phase of the project is complete.

According to some possible implementations, a method may include receiving, by a device, a request for a contract associated with a project. The request may include a blockchain identifier for an organization associated with the project and a set of project requirements for the project. The method may include identifying, by the device, one or more conditions that are associated with the set of project requirements. The method may include generating, by the device, the contract using information included in the request. The contract may include the one or more conditions that are associated with the set of project requirements. The method may include creating, by the device, one or more blocks in a blockchain using the one or more conditions of the contract and the blockchain identifier. The method may include receiving, by the device, multimedia data regarding completion of a phase of the project. The method may include analyzing, by the device, the multimedia data to generate metadata associated with the multimedia data. The method may include verifying, by the device, whether the phase of the project is complete using the metadata associated with the multimedia data. The method may include performing, by the device, one or more actions based on verifying whether the phase of the project is complete.

According to some possible implementations, a non-transitory computer-readable medium may store one or more instructions that, when executed by one or more processors, cause the one or more processors to receive a request for a contract associated with a project. The request may include a blockchain identifier for an organization associated with the project and a set of project requirements for the project. The one or more instructions may cause the one or more processors to generate the contract using information included in the request. The contract may include one or more conditions that are associated with the set of project requirements. The one or more instructions may cause the one or more processors to create one or more blocks in a blockchain using the one or more conditions of the contract and the blockchain identifier. The one or more instructions may cause the one or more processors to receive multimedia data regarding completion of a phase of the project. The multimedia data may include a plurality of types of multimedia data. The one or more instructions may cause the one or more processors to verify whether the phase of the project is complete using metadata associated with the multimedia data. The one or more instructions may cause the one or more processors to perform one or more actions based on verifying whether the phase of the project is complete.

DETAILED DESCRIPTION

The following detailed description of example implementations refers to the accompanying drawings. The same reference numbers in different drawings may identify the same or similar elements.

A group of organizations (e.g., non-profit organizations) may bid for rights to carry out projects offered by a host organization (e.g., a government-run organization). For example, a project may involve building a school, providing disaster relief, improving the environment, or the like. The host organization may consider a set of bids by the group of organizations, and may select an organization from the group to carry out the project. In some cases, the project may be broken into phases that, if successfully completed by the selected organization, may cause the host organization to perform a transaction with the selected organization (e.g., a transaction to provide a payment).

However, the host organization may be late to perform transactions with the selected organization due to a high volume of requests to process. Additionally, the selected organization may devote additional time and resources to providing proof of meeting a particular project deadline, instead of focusing time and resources on delivering a high quality product or service.

Some implementations described herein provide a verification platform to use a set of verification tools to verify completion of one or more conditions of a contract and to orchestrate transactions between parties of the contract when the one or more conditions are satisfied. For example, the verification platform may generate a contract (e.g., a smart contract) that includes one or more conditions of a contract associated with a project, and may store the one or more conditions using a blockchain. In this case, the verification platform may receive multimedia data associated with completion of a phase of the project. Additionally, the verification platform may verify whether the phase of the project is complete using metadata associated with the multimedia data. Furthermore, the verification platform may perform one or more actions based on verifying whether the phase of the project is complete.

In this way, the verification platform is able to use a set of verification tools to securely verify completion of one or more phases of a project. Additionally, the verification platform conserves processing resources by enabling quick and efficient verification of the one or more phases of the project. Furthermore, automated verification of projects conserves network resources and/or processing resources relative to manual verification of projects (e.g., because manual verification may lead to human error and/or subjective processing, and may require additional network resources and/or processing resources to re-do verification or to execute error correction techniques).

FIGS. 1A-1D are diagrams of an overview of an example implementation 100 described herein. As shown in FIGS. 1A-1D, example implementation 100 may provide a verification platform to use a set of verification tools to verify conditions of a contract between two parties. Additionally, the verification platform may orchestrate a secure transfer of value (e.g., a payment) upon completion of one or more conditions of the contract.

Figure 1A:
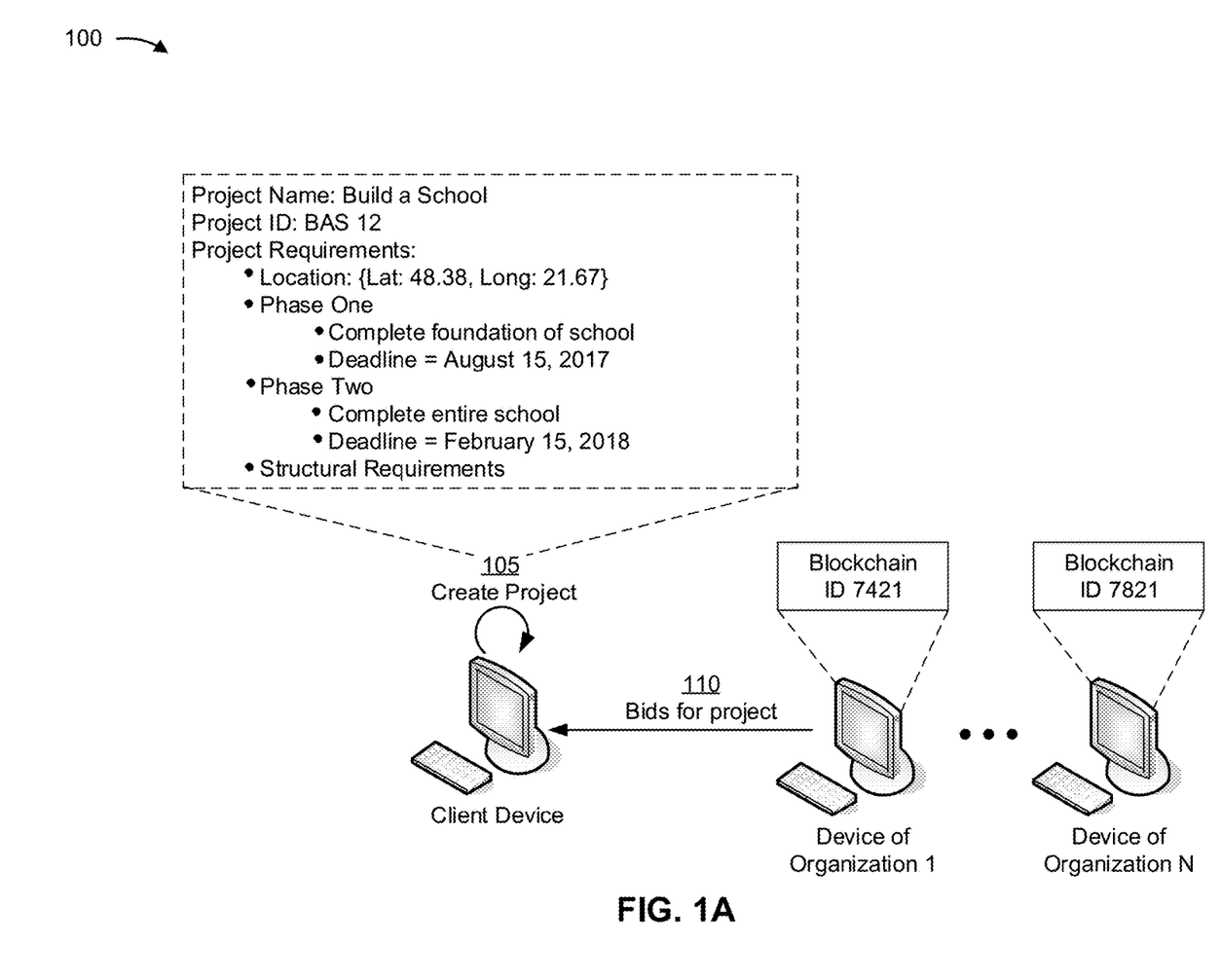
FIGS. 1A-1D are diagrams of an overview of an example implementation described herein.

As shown in FIG. 1A, and by reference number 105, a user may interact with a user interface of a client device to create a project. For example, a user of a host organization may access a web interface that supports creation of projects, and may provide project information for a project as input to the web interface. The project information may include a project name, one or more project identifiers (e.g., an overall project identifier, a project identifier for a phase of the project, etc.), a set of project requirements, such as a geographic location of the project, deadlines for the project, structural requirements associated with the project, and/or the like.

As shown as an example, the project may be a project to build a school. In this case, the project information may include a project name "Build a School," a project identifier "BAS 12," an instruction to build the school at a particular geographic location (e.g., "latitude 48.38, longitude 21.67,"), information indicating phases of the project and deadlines associated with the phases (e.g., shown by "phase one" and "phase two"), and structural requirements (e.g., a quantity of classrooms to create, a quantity of windows to include, etc.).

As shown by reference number 110, the client device may receive bids for the project. For example, a set of organizations can view an advertisement for the project (e.g., displayed via the web interface used to create the project, or via a different web interface), and each organization may submit a bid to win contract rights to carry out the project. In some cases, information regarding each bidding organization may be included in a blockchain (e.g., each bidding organization may have a unique blockchain identifier). As shown, organization 1 may be associated with blockchain identifier 7421, and organization N may be associated with blockchain identifier 7812.

In this way, the client device is able to receive bids for the project that may be used to select an organization to carry out the project.

Figure 1B:
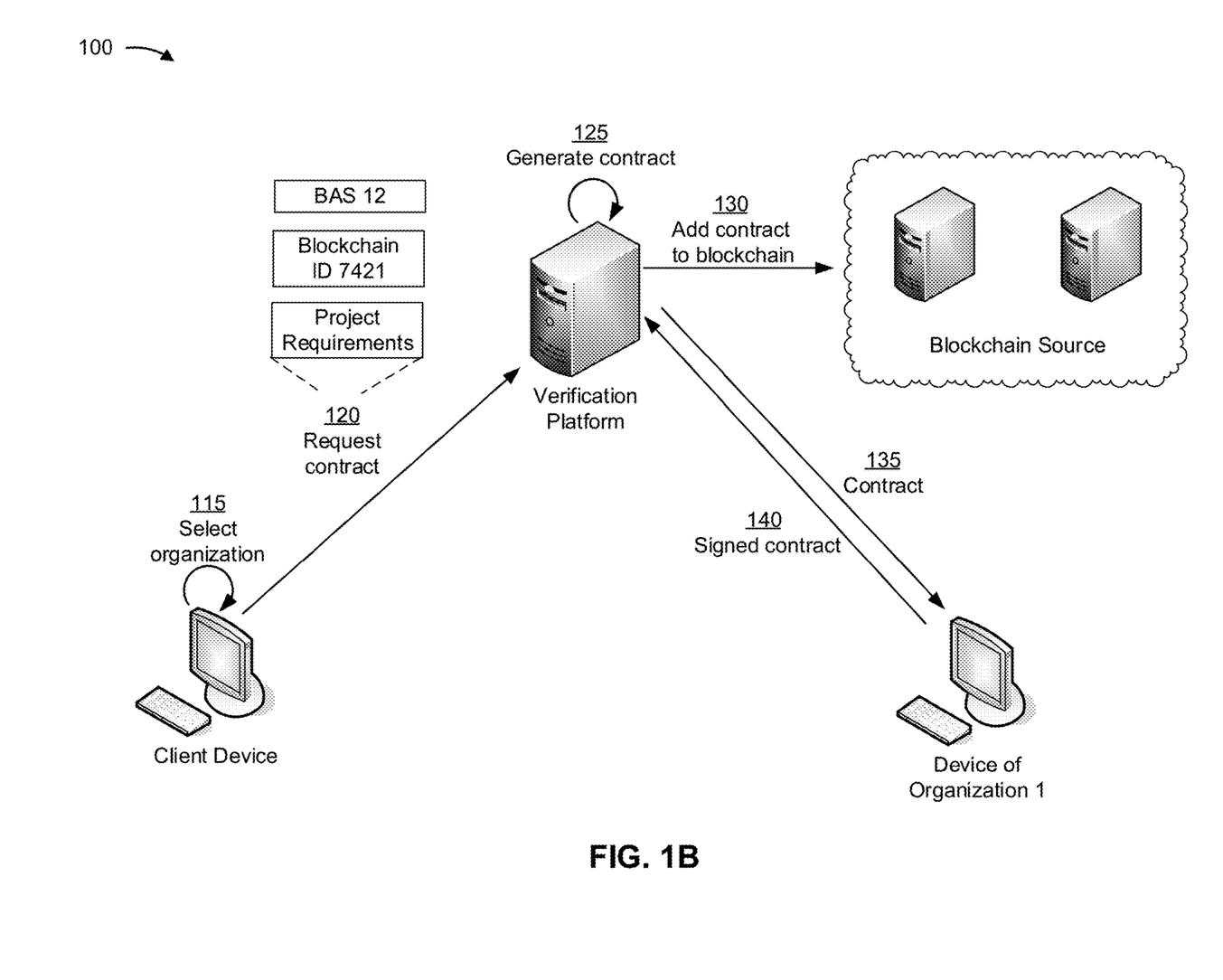

As shown in FIG. 1B, and by reference number 115, the client device may select an organization for the project. For example, a user may review the bids, and may select an organization (e.g., organization 1) for the project. As shown by reference number 120, the verification platform may receive, from the client device, a request for a contract (e.g., a smart contract). The request may include the project identifier (e.g., BAS12), the blockchain identifier for the selected organization (e.g., identifier (ID) 7421), the set of project requirements for the project, and/or the like.

As shown by reference number 125, the verification platform may generate the contract. For example, the verification platform may use the set of project requirements to generate a contract that includes one or more conditions. A condition may be a function or code block that automatically executes to facilitate, verify, or enforce performance of the contract.

As shown by reference number 130, the verification platform may add the contract to a blockchain associated with a blockchain source. For example, the blockchain source may be a distributed ledger storing transaction records for a set of projects associated with a set of organizations. In this case, the verification platform may use the blockchain identifier to create a block for a blockchain associated with the project. Additionally, the block may be used to store the contract, such that a user may access the contract using the blockchain identifier and/or credential information (e.g., a username and password, biometric information, etc.).

As shown by reference number 135, the verification platform may provide the contract to a device associated with organization 1. As shown by reference number 140, after a user associated with organization 1 reads and signs the contract, the user may interact with an interface of the device of organization 1 to provide the signed contract to the verification platform.

Additionally, the verification platform may associate a project identifier for the project and the blockchain identifier for the organization selected for the project. For example, the verification platform may associate the project identifier and the blockchain identifier using a data structure. In this way, the verification platform is able to receive multimedia data for the project that includes only the project identifier, and may use the project identifier to identify the blockchain identifier which may be used to search the blockchain for the contract.

In this way, the verification platform is able to generate a contract and provide the contract to the blockchain to allow for secure verification of one or more conditions of the contract.

Figure 1C:
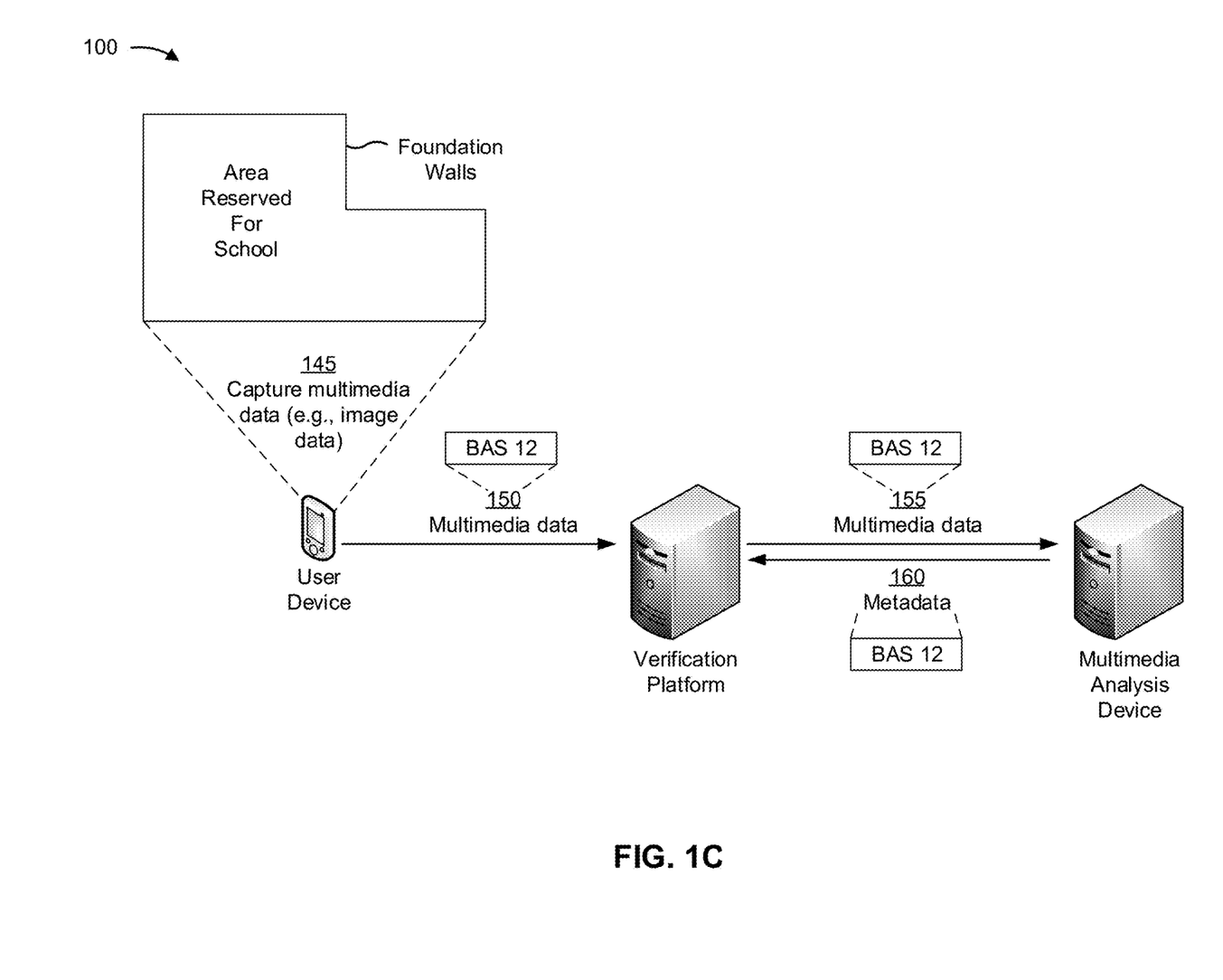

As shown in FIG. 1C, and by reference number 145, when a phase of the project is complete, a user may interact with a user device (e.g., a smartphone) to take a picture to use as proof that the phase is complete. For example, as shown, the user can obtain multimedia data by taking one or more pictures of a foundation of the school to show that the foundation is built prior to the Aug. 15, 2017 deadline. Additionally, or alternatively, multimedia data may be obtained via drone (e.g., capturing footage via an aerial view of the project), via sensors (e.g., that monitor the environment surrounding the project), and/or the like.

As shown by reference number 150, the smartphone may provide the multimedia data to the verification platform. The multimedia data (e.g., image data, video data, audio data, text data, etc.) and may be used to satisfy the one or more conditions of the contract, as described further herein.

As shown by reference number 155, the verification platform may provide the multimedia data to a multimedia analysis device, and the multimedia analysis device may use an object recognition technique to generate metadata for the multimedia data. The metadata may include an identifier of an object (e.g., a type of place, thing, or person identified by the multimedia data), information associated with attributes of the object, location information of the object, a confidence score associated with the object or the information associated with the attributes of the object, and/or the like.

As shown by reference number 160, the multimedia analysis device may provide the metadata associated with the multimedia data to the verification platform.

In this way, the verification platform is able to obtain metadata that may be used to verify whether a phase of the project is complete.

Figure 1D:
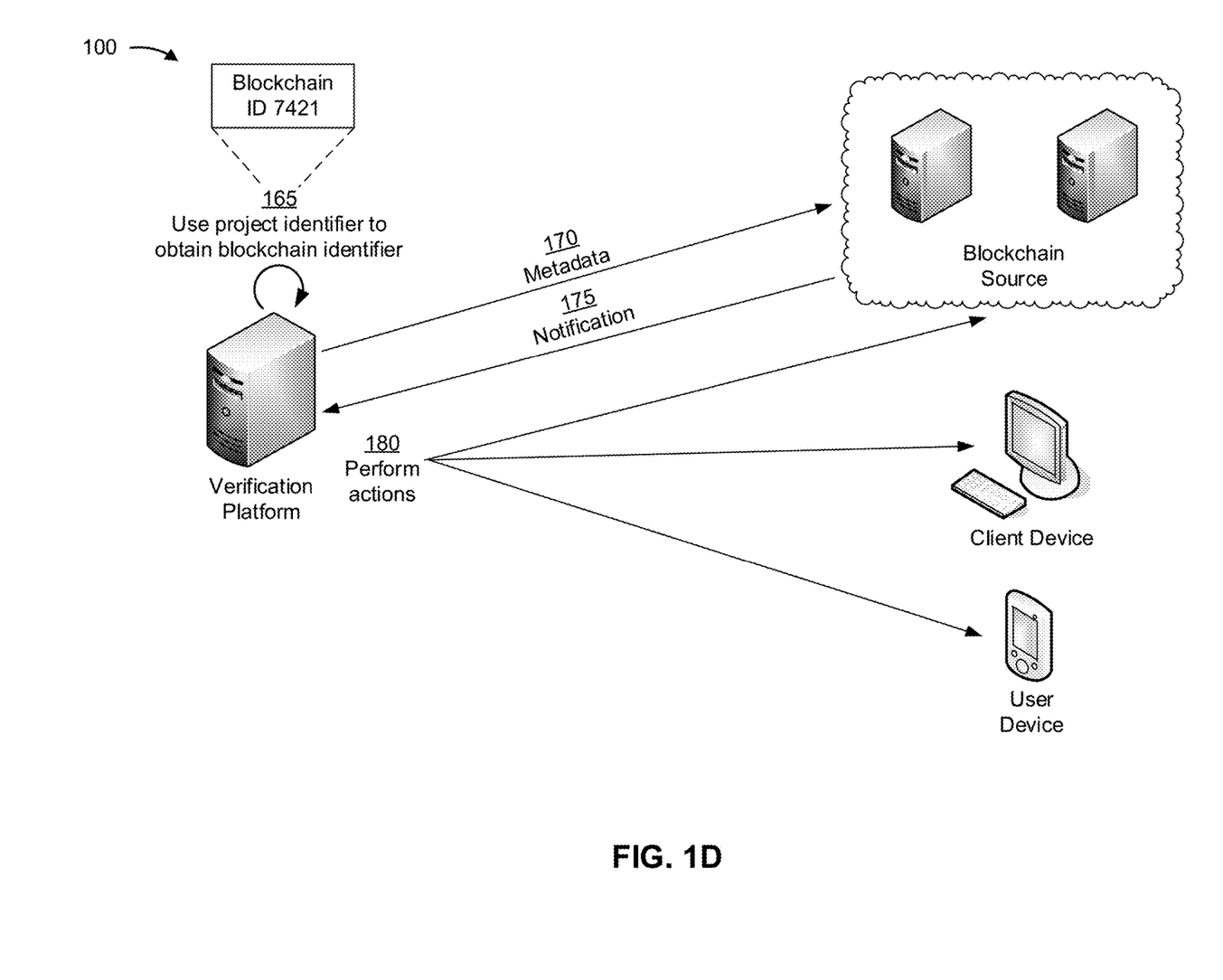

As shown in FIG. 1D, and by reference number 165, the verification platform may use the project identifier to obtain the blockchain identifier. For example, the verification platform may use the project identifier included in the multimedia data to search the data structure for the blockchain identifier, thereby allowing the verification platform to identify the blockchain that stores the contract.

As shown by reference number 170, the verification platform may provide the metadata to the blockchain associated with the blockchain source. For example, the verification platform may use the blockchain identifier to access the blockchain, and may provide the metadata as input to the contract. In this case, the contract, upon receiving the metadata as input, self-executes and outputs a value indicating whether the project requirements for phase one of the project are complete.

In some implementations, if the contract outputs a value indicating that phase one of the project is complete, then the contract may automatically perform a transaction (e.g., make or schedule a payment) with another device. For example, the contract may automatically provide cryptocurrency to an account with a blockchain identifier associated with the client device (e.g., an organization that was assigned the project). In other cases, the contract may automatically perform a transaction with a device associated with a bank (e.g., using an application programming interface (API)).

As shown by reference number 175, the verification platform may receive, from the blockchain, a notification indicating whether the verification succeeded or failed. As shown by reference number 180, the verification platform may perform one or more actions. For example, the verification platform may create one or more additional blocks for the blockchain to update the blockchain with a result of the verification.

In some implementations, the verification platform may provide the notification indicating whether the verification succeeded or failed to another device (e.g., the user device, the client device, etc.). For example, the verification platform may provide the notification to the user device to alert users working on the project that the phase of the project is not complete. In this case, the users may fix a deficiency associated with the project, and may provide new multimedia data once the deficiency has been corrected.

In some implementations, the verification platform may provide a status update for the project. For example, the verification platform may provide a status update for the project for display on a user interface of the client device. In this case, a user may access the client device to view a real-time status of the project.

In this way, the verification platform is able to use a set of verification tools to verify the contract and to orchestrate a transaction between parties engaged in the contract.

As indicated above, FIGS. 1A-1D are provided merely as an example. Other examples are possible and may differ from what was described with regard to FIGS. 1A-1D. For example, while implementations described above utilize verification tools in the context of verifying completion of a project to build a school, in practice, other implementations may utilize verification tools in other contexts, such as a project associated with improving network infrastructure for an organization, a project associated with supply chain optimization, and/or the like.

Figure 2:
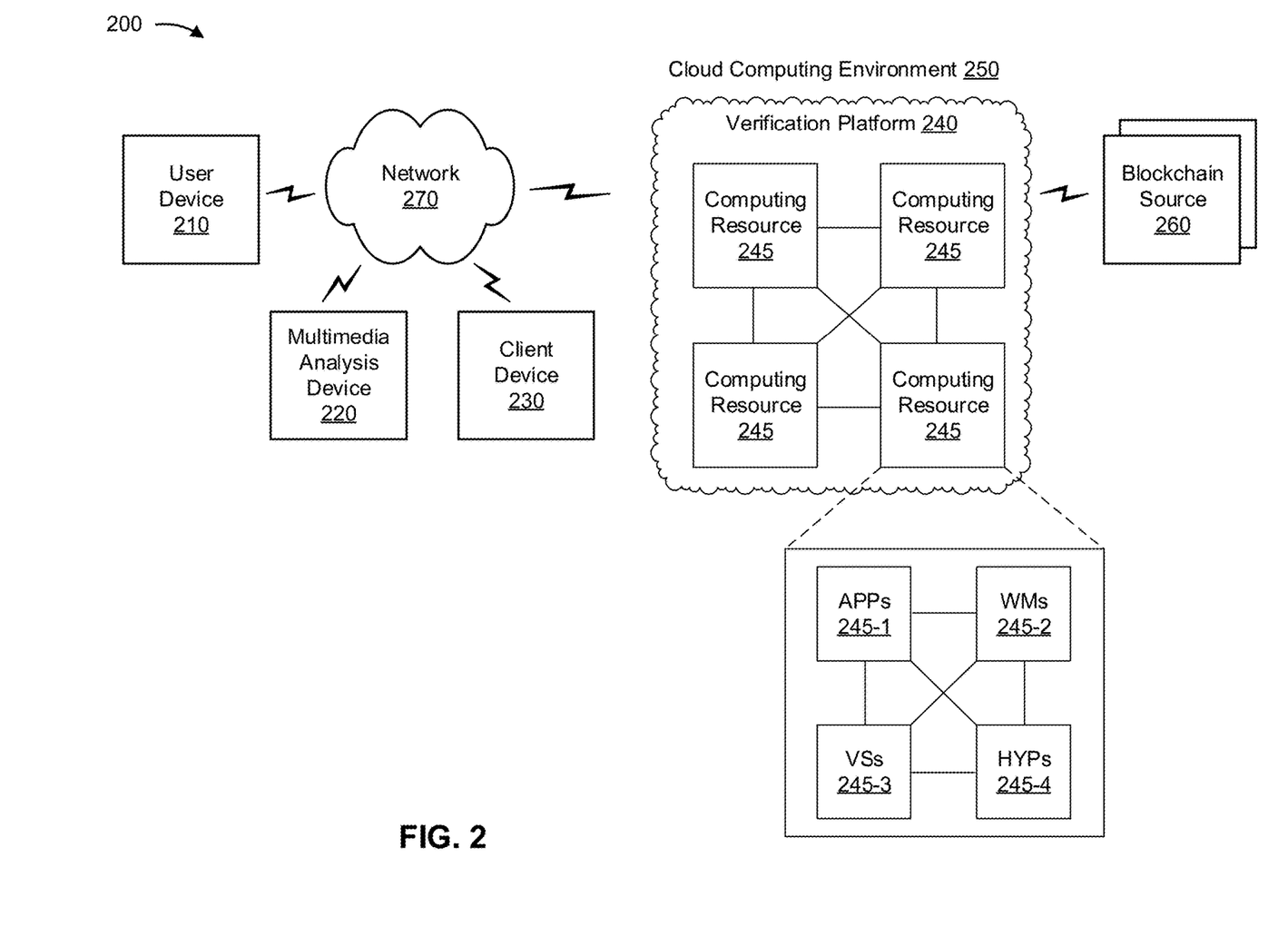
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a multimedia analysis device 220, a client device 230, a verification platform 240 hosted within a cloud computing environment 250, a blockchain source 260, and/or a network 270. Devices of environment 200 may interconnect via wired connections, wireless connections, or a combination of wired and wireless connections.

User device 210 includes one or more devices capable of receiving, storing, generating, processing, and/or providing information associated with a project. For example, user device 210 may include a computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), a sensor, a device that houses a sensor, a device capable of capturing information as multimedia data (e.g., an unmanned aerial vehicle), or a similar type of device.

In some implementations, user device 210 may interact with an external environment to capture multimedia data (e.g., which may be saved as multimedia data). For example, user device 210 may take a picture, and the picture may be saved as image data. In some implementations, user device 210 may provide multimedia data to verification platform 240.

Multimedia analysis device 220 includes one or more devices capable of receiving, storing, generating, processing, and/or providing information associated with a project. For example, multimedia analysis device 220 may include a server device or a group of server devices. In some implementations, multimedia analysis device 220 may receive multimedia data from verification platform 240. In some implementations, multimedia analysis device 220 may execute an object recognition technique on the multimedia data to generate metadata, and may provide the metadata to verification platform 240. In some implementations, intelligence associated with multimedia analysis device 220 may be performed by verification platform 240.

Client device 230 includes one or more devices capable of receiving, storing, generating, processing, and/or providing information associated with a project. For example, client device 230 may include a computing device, such as a server, a desktop computer, a laptop computer, a tablet computer, a handheld computer, a mobile phone, or a similar type of device.

In some implementations, client device 230 may receive bids for a project from devices associated with various organizations. In some implementations, bids for projects may be provided to a device that hosts a web interface, and a user may interact with client device 230 to access the web interface and view the bids. In some implementations, client device 230 may select a bid, and may provide a request for a smart contract to verification platform 240. In some implementations, client device 230 may receive, from verification platform 240, information associated with verifying a smart contract. In some implementations, client device 230 may receive information associated with viewing a status of a project from verification platform 240.

Verification platform 240 includes one or more devices capable of receiving, storing, generating, processing, and/or providing information associated with a project. For example, verification platform 240 may include a server device (e.g., a host server, a web server, an application server, etc.), a data center device, or a similar device. In some implementations, verification platform 240 may provide a contract (e.g., a smart contract) to blockchain source 260. In some implementations, verification platform 240 may provide metadata associated with a contract (e.g., a smart contract) to blockchain source 260. In some implementations, verification platform 240 may receive, from blockchain source 260, information associated with whether a verification succeeded or failed. In some implementations, verification platform 240 may orchestrate a transaction (e.g., a payment) between two devices.

In some implementations, as shown, verification platform 240 may be hosted in cloud computing environment 250. Notably, while implementations described herein describe verification platform 240 as being hosted in cloud computing environment 250, in some implementations, verification platform 240 may not be cloud-based (i.e., may be implemented outside of a cloud computing environment) or may be partially cloud-based.

Cloud computing environment 250 includes an environment that hosts verification platform 240. Cloud computing environment 250 may provide computation, software, data access, storage, and/or other services that do not require end-user knowledge of a physical location and configuration of system(s) and/or device(s) that host verification platform 240. As shown, cloud computing environment 250 may include a group of computing resources 245 (referred to collectively as "computing resources 245" and individually as "computing resource 245").

Computing resource 245 includes one or more personal computers, workstation computers, server devices, or other types of computation and/or communication devices. In some implementations, computing resource 245 may host verification platform 240. The cloud resources may include compute instances executing in computing resource 245, storage devices provided in computing resource 245, data transfer devices provided by computing resource 245, etc. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by a device associated with an interested party. Application 245-1 may eliminate a need to install and execute the software applications on user device 210 or client device 230. For example, application 245-1 may include software associated with verification platform 240 and/or any other software capable of being provided via cloud computing environment 250. In some implementations, one application 245-1 may transmit/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program, and may support a single process. In some implementations, virtual machine 245-2 may execute on behalf of a user, and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems, and may manage the execution of the guest operating systems. Multiple instances of a variety of operating systems may share virtualized hardware resources.

Blockchain source 260 includes one or more devices capable of receiving, storing, generating, processing, and/or providing information associated with a contract. For example, blockchain source 260 may include a set of devices that includes one or more server devices, one or more desktop computers, one or more laptop computers, one or more mobile phones, and/or one or more similar types of devices. In some implementations, blockchain source 260 may include a set of secure blockchains that are only accessible by registered users. For example, a user device may access a blockchain included in blockchain source 260 using credential information that includes a blockchain identifier. In some implementations, blockchain source 260 may perform a transaction with another device (e.g., a device associated with a bank, another device in the blockchain, etc.) based on a condition of a contract being satisfied.

Network 270 includes one or more wired and/or wireless networks. For example, network 270 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
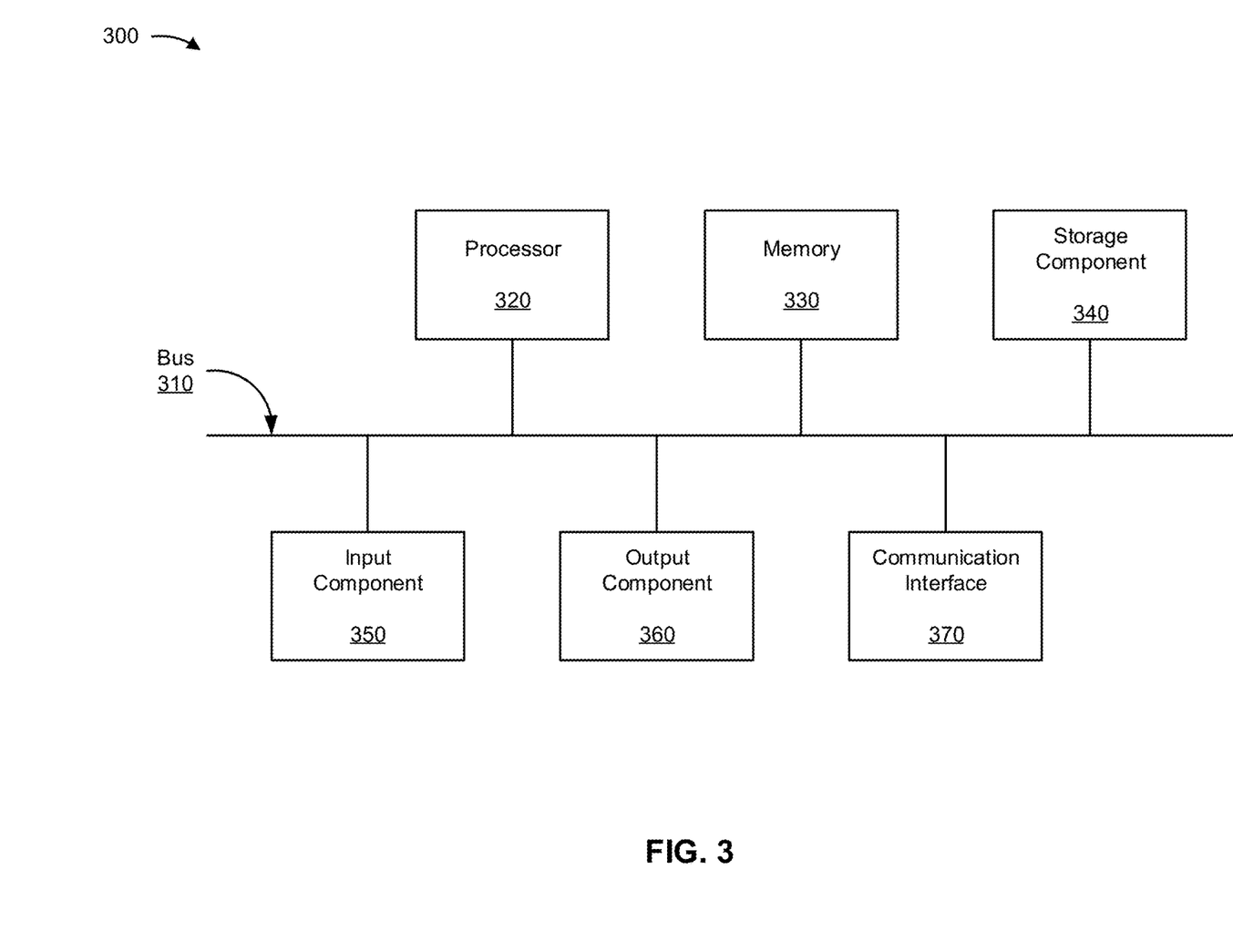
FIG. 3 is a diagram of example components of one or more devices of FIG. 2.

FIG. 3 is a diagram of example components of a device 300. Device 300 may correspond to user device 210, multimedia analysis device 220, client device 230, verification platform 240, and/or blockchain source 260. In some implementations, user device 210, multimedia analysis device 220, client device 230, verification platform 240, and/or blockchain source 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
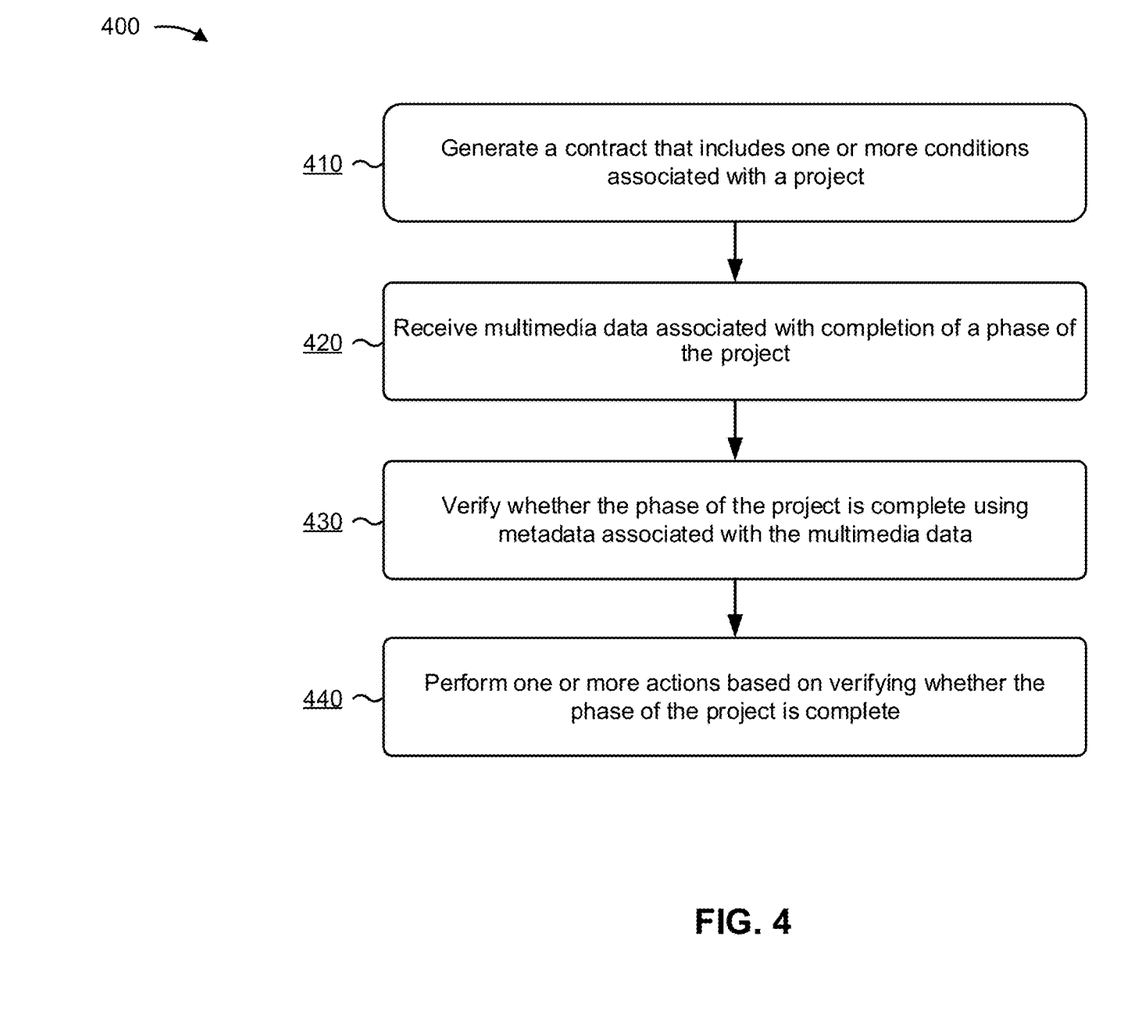
FIG. 4 is a flow chart of an example process for using a set of verification tools to verify a contract and to orchestrate a transaction between two or more devices based on verification of the contract.

FIG. 4 is a flow chart of an example process 400 for using a set of verification tools to verify a contract and to orchestrate a transaction between two or more devices based on verification of the contract. In some implementations, one or more process blocks of FIG. 4 may be performed by verification platform 240. In some implementations, one or more process blocks of FIG. 4 may be performed by another device or a group of devices separate from or including verification platform 240, such as user device 210, multimedia analysis device 220, client device 230, and/or blockchain source 260.

As shown in FIG. 4, process 400 may include generating a contract that includes one or more conditions associated with a project (block 410). For example, verification platform 240 may receive a request for a contract (e.g., a smart contract) associated with a project, and may, based on information included in the request, generate the contract to include one or more conditions associated with the project.

In this case, each condition generated may be a function or a code block that helps to facilitate, verify, and/or enforce the performance of the contract. For example, the one or more conditions may include a condition associated with a time requirement of the project, a condition associated with a structural requirement of the project, a condition associated with a quality requirement of the project, and/or the like.

In some implementations, prior to generating one or more conditions for a contract, client device 230 may create a project. For example, a user may interact with a user interface associated with client device 230 to input project information for the project, which may cause the project information to be displayed via a user interface associated with a web service. In this case, the web service may display the project information in the form of an advertisement (e.g., like a request for proposal) to solicit organizations to aid in carrying out particular projects. The project information may include a project name, one or more project identifiers (e.g., an overall project identifier, one or more project phase identifiers to identify particular phases of the project, etc.), a set of project requirements (e.g., a location of the project, project deadlines, a set of project specification requirements, such as structural requirements or quality requirements of the project, etc.), and/or the like.

Additionally, organizations may view the advertisement and submit bids for the project. In this case, a user associated with client device 230 may accept a bid and may select an organization to carry out the project.

In some implementations, verification platform 240 may receive a request for a contract. For example, verification platform 240 may receive, from client device 230, a request for a contract that includes an identifier of the organization selected to carry out the project, the project name, the one or more project identifiers, the set of project requirements, and/or the like.

In some implementations, verification platform 240 may generate a contract. For example, verification platform 240 may use the set of project requirements to generate a smart contract that includes the one or more conditions. In some implementations, verification platform 240 may generate a contract by providing the set of project requirements to a device of a software developer, and the software developer may use the set of project requirements to generate the one or more conditions of the contract or verify the one or more conditions of the contract generated by verification platform 240.

In some implementations, verification platform 240 may generate a contract automatically. For example, assume verification platform 240 associates a set of conditions with a set of project requirement identifiers (e.g., using a data structure). In this case, when a user interacts with the web service to create the project, the user may select project requirements (e.g., from a pull-down menu) that are associated with conditions.

Additionally, when verification platform 240 receives the request to generate the contract, verification platform 240 may analyze the set of project requirements included in the request to obtain the set of project requirement identifiers. In this case, verification platform 240 may use the set of project requirement identifiers to search the data structure for the set of conditions, and may use the set of conditions when generating the contract.

As an example, assume a user interacts with client device 230 to input project requirements (e.g., where a school is to be built, when the school is to be built by, deadlines for one or more phases of the project, project specification details, etc.). In this example, for each project requirement of the project, verification platform 240 may generate a condition in the contract that fulfills that particular requirement. For example, a condition to complete the project before a particular deadline may include code that returns true if a project submission timestamp pre-dates a project deadline timestamp (e.g., code may return true if a condition is satisfied).

Continuing with the example, verification platform 240 may generate the contract by obtaining a condition associated with the project deadline from a repository of conditions. For example, a condition may exist in the repository that returns true if a project submission timestamp pre-dates a project deadline timestamp.

In some implementations, verification platform 240 may generate a contract by receiving a request that includes a multitude of project requirements. For example, a multitude of project requirements for a school may include requirements relating to materials to be used, a quantity and/or location of electrical outlets, a quantity of classrooms, bathrooms, water lines, boilers, air conditioning units, and/or the like. Furthermore, the multitude of project requirements may include a requirement to obtain approval via an inspection (e.g., a government inspection), a requirement relating to safety features, a requirement associated with parameters for a roof of the school, and/or the like. In this way, verification platform 240 may generate a contract that includes a multitude of project requirements.

In some implementations, verification platform 240 may generate a contract relating to a group of organizations. For example, verification platform 240 may receive a request that includes a set of project requirements where different organizations within the group perform different aspects of the project. In this case, verification platform 240 may generate the contract to include conditions associated with the group of organizations.

In some implementations, verification platform 240 may generate a contract using a machine learning technique. For example, verification platform 240 may obtain historical data (e.g., historical contract data, historical project data, etc.) from a data structure, and may use the historical data to train a data model. In this case, verification platform 240 may provide a project requirement as input to the data model, which may cause the data model to output a value associated with a particular condition.

Additionally, or alternatively, verification platform 240 may use a forecasting technique to recommend project requirements not included in the request. For example, verification platform 240 may use a forecasting technique to analyze historical contract data and/or historical project data to identify a set of conditions to recommend for a project. In this case, the set of conditions may include conditions that correspond to project requirements included in the request, and conditions that do not correspond to project requirements included in the request (e.g., but that satisfy a threshold level of similarity with the project requirements included in the request).

In some implementations, verification platform 240 may obtain a signed version of the contract. For example, verification platform 240 may provide the contract to a device associated with the organization that is selected to carry out the project. In this case, a user may interact with the device to electronically sign the contract, and the device may provide the signed version of the contract to verification platform 240.

In some implementations, verification platform 240 may store the contract. For example, verification platform 240 may store the contract using a blockchain. In this case, verification platform 240 may create one or more blocks in the blockchain using the one or more conditions of the contract and a blockchain identifier. The blockchain identifier may be associated with the organization selected to carry out the project, and may be used to securely access the blockchain (e.g., to add a block, to obtain information associated with a block, etc.). Furthermore, a block in a blockchain may store the contract, multiple conditions of the contract, an individual condition, a subset of a condition, and/or the like.

Additionally, or alternatively, verification platform 240 may associate the blockchain identifier and the project identifier. For example, verification platform 240 may associate the blockchain identifier with the project identifier for the project by storing the two identifiers together using a data structure. In this way, verification platform 240 may receive multimedia data regarding completion of a phase of the project (e.g., that includes the project identifier but not the blockchain identifier), and may use the project identifier to identify the blockchain identifier, thereby allowing verification platform 240 to access the blockchain, as described further herein.

In this way, verification platform 240 is able to generate a contract for a project and store the contract using a blockchain.

As further shown in FIG. 4, process 400 may include receiving multimedia data associated with completion of a phase of the project (block 420). For example, verification platform 240 may receive, from user device 210, multimedia data associated with completion of a phase of the project. The multimedia data may be used to satisfy the one or more conditions of the contract, and may be image data, video data, audio data, text data, a graphical object, an animation sequence, data associated with one or more internet of things (IoT) sensors, and/or the like.

In some implementations, verification platform 240 may receive multimedia data. For example, assume employees, of the organization selected to carry out the project, complete a particular phase of the project or a particular requirement of the project. In this case, an employee may access user device 210 to submit, to verification platform 240, multimedia data indicating that the particular phase or the particular requirement of the project is complete.

As a specific example, assume the project is to build a school. Further assume that a project manager completes phase one of the project by building a foundation for the school. In this case, the project manager may interact with user device 210 to obtain multimedia data relating to completion of phase one of the project. For example, the project manager may use user device 210 to take pictures of the foundation of the school, to obtain information indicating the materials that were used to build the foundation, to obtain information indicating dimensions of the foundation, to obtain information that the foundation was built to specifications, to obtain information regarding inspections of the foundation (e.g., to indicate that the foundation meets a particular standard), and/or the like. The project manager may use user device 210 to send the multimedia data to verification platform 240 as proof that the foundation has been built.

In some implementations, verification platform 240 may receive different types of multimedia data (e.g., multimedia of different data types). For example, to verify a phase of the project, one or more devices may be used to obtain or capture proof of completion of the phase of the project, and the one or more devices may obtain or capture proof of completion by obtaining multimedia data of different data types (e.g., a text data type, an audio data type, a video data type, an image data type, etc.).

As an example, assume verification platform 240 receives multimedia data as proof that a foundation of a school has been built. In this case, the multimedia data may include one or more image files showing the foundation of the school, a video file showing a clip of the entire foundation of the school, a text file showing a signature of an inspector approving the foundation, and/or the like. In this way, verification platform 240 is able to receive multimedia data of a multitude of different data types, and may verify whether the multimedia data satisfies one or more conditions of the contract, as described herein.

In this way, verification platform 240 is able to receive multimedia data regarding completion of a phase of the project.

As further shown in FIG. 4, process 400 may include verifying whether the phase of the project is complete using metadata associated with the multimedia data (block 430). For example, verification platform 240 may obtain metadata associated with the multimedia data, and may use the metadata to verify whether the phase of the project is complete. The metadata may include an identifier of an object (e.g., a type of place, a thing, a person, etc.) identified by the multimedia data, information associated with attributes of the object, a confidence score associated with the identifier of the object or the information associated with the attributes of the object, location information associated with the object, and/or the like.

In some implementations, verification platform 240 may standardize the multimedia data. For example, verification platform 240 may receive multimedia data associated with different data types, data formats, or the like, and may standardize the multimedia data to a uniform data type, data format, or the like. In some implementations, verification platform 240 may apply different standardization techniques for different data types or data formats. In some implementations, verification platform 240 may first obtain metadata associated with the multimedia data, and may perform standardization techniques on the metadata.

In some implementations, verification platform 240 may obtain metadata associated with the multimedia data using multimedia analysis device 220. For example, verification platform 240 may provide the multimedia data to multimedia analysis device 220 to cause multimedia analysis device 220 to analyze the multimedia data and generate the metadata. In this case, multimedia analysis device 220 may analyze the multimedia data using an object recognition technique, such as an appearance-based method, a computer vision method, a feature-based method, artificial neural networks and deep learning, fast indexing, and/or the like. Additionally, or alternatively, multimedia analysis device 220 may analyze the multimedia data using a natural language processing technique, a machine learning technique, an audio-based analysis technique, and/or the like. Additionally, the object recognition technique may generate the metadata, and multimedia analysis device 220 may provide the metadata to verification platform 240.

In some implementations, verification platform 240 may generate metadata associated with the multimedia data by analyzing the multimedia data. For example, verification platform 240 may analyze the multimedia data in a similar fashion to that described above with respect to multimedia analysis device 220. In this way, multimedia analysis device 220 and/or verification platform 240 may obtain metadata for multimedia data associated with different data types.

In some implementations, prior to verifying whether the phase of the project is complete, verification platform 240 may identify the blockchain identifier. For example, the multimedia data may include the project identifier, and verification platform 240 may use the project identifier to search a data structure that associates the project identifier with the blockchain identifier. In this way, verification platform 240 may use the blockchain identifier to access the contract that is stored by the blockchain.

In some implementations, verification platform 240 may verify whether the phase of the project is complete. For example, assume verification platform 240 uses the blockchain identifier to access the contract stored by the blockchain. In this case, verification platform 240 may provide the metadata associated with the multimedia data as input to the contract to cause the contract to output a value indicating whether the phase of the project is complete. For example, the contract may compare the metadata to a condition, of the one or more conditions of the project, and the condition may output the value indicating whether the phase of the project is complete.

In some implementations, the contract may output a value indicating that the phase of the project is complete. For example, verification platform 240 may provide the metadata associated with the multimedia data as input to the contract to cause the contract to output a value indicating that the phase of the project is complete. In this case, the contract may compare the metadata to a condition, and the condition may output a value indicating that the phase of the project is complete.

In some implementations, the contract may output a value indicating that the phase of the project is not complete or that the verification failed. For example, verification platform 240 may provide the metadata associated with the multimedia data as input to the contract to cause the contract to output a value indicating that the phase of the project is not complete. In this case, the contract may compare the metadata to a condition, and the condition may output a value indicating that the phase of the project is not complete.

In some implementations, the contract may output a value indicating whether a phase of the contract is complete based on a threshold. For example, assume the metadata includes an object name of an object that is identified using an object recognition technique, and a confidence score indicating a degree of confidence that the object is correctly identified. In this case, verification platform 240 may provide the metadata as input to the contract, and the contract may compare the confidence score to a pre-determined confidence threshold, and may output a value based on whether the confidence score satisfies the confidence threshold.

In some implementations, the contract may output a value indicating whether a phase of the contract is complete based on weights and thresholds. For example, a contract may include a set of conditions, where each condition is associated with a confidence threshold, as described above. In this case, conditions may be weighted (e.g., based on importance to a user). Additionally, each condition may output a confidence score, and the contract may weight each confidence score to determine an overall value that indicates whether a phase of the contract is completed.

In some implementations, the contract may output a value indicating whether a phase of the contract is complete based on one or more data models. For example, assume verification platform 240 generates a set of data models for a set of conditions of a contract. In this case, verification platform 240 may provide the metadata as input to the set of data models, and the set of data models may output confidence scores in the manner described above. In this case, the contract may analyze the confidence scores to determine an overall score, which may determine whether a phase of the contract is complete.

In some implementations, the contract or verification platform 240 may automatically perform a transaction with another device. For example, the contract or verification platform 240 may automatically perform a transaction with another device based on outputting a value indicating that the phase of the project is complete. In some cases, the output value may cause the contract or verification platform 240 to automatically provide cryptocurrency to an account associated with a blockchain identifier of a different organization (e.g., an organization that assigned the project). In other cases, the output value may cause the contract or verification platform 240 to automatically perform a transaction with a device associated with a bank using an application programming interface (API). Additionally, a record of the transaction may be stored as one or more blocks in the blockchain.

In some implementations, verification platform 240 may receive a notification indicating whether the phase of the project is complete. For example, verification platform 240 may receive a notification after the contract outputs the value indicating whether the phase of the project is complete. In this case, the notification may include a value indicating whether the phase of the project is complete, information that caused the contract to output the value (e.g., a confidence score associated with the metadata, a confidence score associated with a condition, etc.).

In this way, verification platform 240 is able to verify whether the phase of the project is complete.

As further shown in FIG. 4, process 400 may include performing one or more actions based on verifying whether the phase of the project is complete (block 440). For example, verification platform 240 may provide (e.g., to user device 210, to client device 230, etc.) a notification indicating whether the verification succeeded or failed, create one or more additional blocks for the blockchain, provide a status update for the project, provide a recommendation for the project for display on the user interface, provide a recommendation to perform a transaction, and/or the like.

In some implementations, verification platform 240 may provide a notification indicating whether the verification succeeded or failed. For example, verification platform 240 may provide a notification to user device 210 and/or client device 230 to alert one or more parties of a result of the verification. As an example, the verification may fail, and verification platform 240 may provide a notification to user device 210. This may alert user device 210 that the verification did not succeed, which may allow a user working on the project to fix any deficiencies associated with the project. Furthermore, the notification may specify project requirements or conditions that were not satisfied or additional actions that need to be performed to complete the phase of the project. Additionally, the user may access user device 210 to obtain new multimedia data and provide the new multimedia data to verification platform 240.

Additionally, or alternatively, verification platform 240 may create one or more additional blocks in the blockchain. For example, assume verification platform 240 receives a notification indicating whether the phase of the project is complete. In this case, verification platform 240 may create one or more additional blocks indicating a result of the attempt to verify the phase of the project. In this way, the blockchain provides a secure record of all (or some) transactions associated with the project.

Additionally, or alternatively, verification platform 240 may provide a status update for the project. For example, verification platform 240 may provide a status update for the project to client device 230. In this case, the status update may be displayed on a user interface of client device 230, and may alert a user as to whether the verification succeeded or failed.

Additionally, or alternatively, verification platform 240 may provide information associated with the verification to client device 230. For example, verification platform 240 may provide information associated with the verification to client device 230 to allow a user to manually verify whether the phase of the project is complete. In some cases, the contract may verify that the phase of the project is complete (or is not complete), but a confidence value included in the metadata may be close to a confidence threshold associated with a condition in the contract. In this case, a user may want to self-verify whether the phase of the project is complete.

Additionally, or alternatively, verification platform 240 may provide a recommendation to perform a transaction. For example, assume the contract does not automatically perform a transaction after verifying that the phase of the project is complete. In this case, verification platform 240 may receive a notification that the phase of the project is complete, and may provide a recommendation to client device 230 to perform a transaction (e.g., provide a payment in exchange for the completion of the phase of the project).

In this way, verification platform 240 may perform one or more actions based on verifying whether the phase of the project is complete.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, verification platform 240 is able to use a set of verification tools to securely verify completion of one or more conditions of a contract. Additionally, verification platform 240 conserves processing resources by enabling quick and efficient verification of the one or more conditions of the contract. Furthermore, automated verification of contracts conserves network resources and/or processing resources relative to manual verification of contracts (e.g., because manual verification may lead to human error, and may require additional network resources and/or processing resources to re-do verification or to execute error correction techniques).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
 analyzing, by a device, a set of project requirements, included in a request for a contract associated with a project, to obtain a set of project requirement identifiers;
 obtaining, by the device, one or more conditions that are associated with the set of project requirements by using the set of project requirement identifiers to search a data structure,
  wherein the data structure associates the one or more conditions and the set of project requirement identifiers;
 obtaining, by the device, historical data associated with other contracts;

training, by the device, a machine learning model, using the historical data, to:
receive, as input, a project requirement, and provide, as output, a value associated with a particular condition;
generating, by the device and using the trained machine learning model, the contract using the one or more conditions,
wherein the contract includes the one or more conditions;
creating, by the device, one or more blocks in a blockchain using the one or more conditions and a blockchain identifier of an organization associated with the project;
verifying, by the device, whether a phase of the project is complete by providing input to the contract to cause the contract to output a value indicating whether the phase of the project is complete; and
performing, by the device, one or more actions based on verifying whether the phase of the project is complete.

2. The method of claim 1, wherein:
a first condition, of the one or more conditions, identifies a first entity responsible for the first condition, and
a second condition, of the one or more conditions, identifies a second entity responsible for the second condition; and
wherein the method further comprises:
providing the first entity and the second entity with access to the blockchain based on the first condition and the second condition.

3. The method of claim 1, further comprising:
analyzing historical contract data to identify another set of conditions associated with one or more historical contracts;
determining that a recommended condition, included in the other set of conditions, corresponds to at least one requirement of the set of project requirements; and
including, in the one or more conditions, the recommended condition.

4. The method of claim 1, further comprising:
storing, in another data structure, data associating the blockchain identifier with a project identifier that identifies the project.

5. The method of claim 1, further comprising:
receiving multimedia data associated with completion of the phase of the project; and
providing the multimedia data as input to the contract to cause the contract to output the value indicating whether the phase of the project is complete.

6. The method of claim 1, wherein performing the one or more actions comprises:
automatically performing a transaction with another device based on verifying that the phase of the project is complete.

7. The method of claim 1, wherein verifying whether the phase of the project is complete comprises:
verifying that the phase of the project is not complete; and
wherein performing the one or more actions comprises:
providing, to another device, a notification indicating that the phase of the project is incomplete.

8. A device, comprising:
one or more memories; and
one or more processors communicatively coupled to the one or more memories, configured to:
analyze a set of project requirements, included in a request for a contract associated with a project, to obtain a set of project requirement identifiers;
obtain one or more conditions that are associated with the set of project requirements by using the set of project requirement identifiers to search a data structure,
wherein the data structure associates the one or more conditions and the set of project requirement identifiers;
obtain historical data associated with other contracts;
train a machine learning model, using the historical data, to:
receive, as input, a project requirement, and
provide, as output, a value associated with a particular condition;
generate the contract using the trained machine learning model and the one or more conditions,
wherein the contract includes the one or more conditions;
create one or more blocks in a blockchain using the one or more conditions and a blockchain identifier of an organization associated with the project;
verify whether a phase of the project is complete by providing input to the contract to cause the contract to output a value indicating whether the phase of the project is complete; and
perform one or more actions based on verifying whether the phase of the project is complete.

9. The device of claim 8, wherein:
a first condition, of the one or more conditions, identifies a first entity responsible for the first condition, and
a second condition, of the one or more conditions, identifies a second entity responsible for the second condition; and
wherein the one or more processors are further configured to:
provide the first entity and the second entity with access to the blockchain based on the first condition and the second condition.

10. The device of claim 8, wherein the one or more processors are further configured to:
analyze historical contract data to identify another set of conditions associated with one or more historical contracts;
determine that a recommended condition, included in the other set of conditions, corresponds to at least one requirement of the set of project requirements; and
include, in the one or more conditions, the recommended condition.

11. The device of claim 8, wherein the one or more processors are further configured to:
store, in another data structure, data associating the blockchain identifier with a project identifier that identifies the project.

12. The device of claim 8, wherein the one or more processors are further configured to:
receive multimedia data associated with completion of the phase of the project; and
provide the multimedia data as input to the contract to cause the contract to output the value indicating whether the phase of the project is complete.

13. The device of claim 8, wherein the one or more processors, when performing the one or more actions, are configured to:
automatically perform a transaction with another device based on verifying that the phase of the project is complete.

14. The device of claim 7, wherein the one or more processors, when verifying whether the phase of the project is complete, are configured to:
  verify that the phase of the project is not complete; and
  wherein the one or more processors, when performing the one or more actions, are configured to:
  provide, to another device, a notification indicating that the phase of the project is incomplete.

15. A non-transitory computer-readable medium storing instructions, the instructions comprising:
  one or more instructions that, when executed by one or more processors, cause the one or more processors to:
  analyze a set of project requirements, included in a request for a contract associated with a project, to obtain a set of project requirement identifiers;
  obtain one or more conditions that are associated with the set of project requirements by using the set of project requirement identifiers to search a data structure,
  wherein the data structure associates the one or more conditions and the set of project requirement identifiers;
  obtain historical data associated with other contracts;
  train a machine learning model, using the historical data, to:
  receive, as input, a project requirement, and provide, as output, a value associated with a particular condition;
  generate the contract using the trained machine learning model and the one or more conditions,
  wherein the contract includes the one or more conditions;
  create one or more blocks in a blockchain using the one or more conditions and a blockchain identifier of an organization associated with the project;
  verify whether a phase of the project is complete by providing input to the contract to cause the contract to output a value indicating whether the phase of the project is complete; and
  perform one or more actions based on verifying whether the phase of the project is complete.

16. The non-transitory computer-readable medium of claim 15, wherein:a first condition, of the one or more conditions, identifies a first entity responsible for the first condition, and
  a second condition, of the one or more conditions, identifies a second entity responsible for the second condition; and
  wherein the one or more instructions, when executed by the one or more processors, further cause the one or more processors to:
  provide the first entity and the second entity with access to the blockchain based on the first condition and the second condition.

17. The non-transitory computer-readable medium of claim 15, wherein the one or more instructions, when executed by the one or more processors, further cause the one or more processors to:
  analyze historical contract data to identify another set of conditions associated with one or more historical contracts;
  determine that a recommended condition, included in the other set of conditions, corresponds to at least one requirement of the set of project requirements; and
  include, in the one or more conditions, the recommended condition.

18. The non-transitory computer-readable medium of claim 15, wherein the one or more instructions, when executed by the one or more processors, further cause the one or more processors to:
  store, in another data structure, data associating the blockchain identifier with a project identifier that identifies the project.

19. The non-transitory computer-readable medium of claim 15, wherein the one or more instructions, when executed by the one or more processors, further cause the one or more processors to:
  receive multimedia data associated with completion of the phase of the project; and
  provide the multimedia data as input to the contract to cause the contract to output the value indicating whether the phase of the project is complete.

20. The non-transitory computer-readable medium of claim 15, wherein the one or more instructions, that cause the one or more processors to perform the one or more actions, further cause the one or more processors to:
  automatically perform a transaction with another device based on verifying that the phase of the project is complete.

* * * * *